United States Patent [19]

Arondel et al.

[11] 4,364,631
[45] Dec. 21, 1982

[54] CATADIOPTRIC DEVICE INTENDED FOR AN OPTICAL RESPONDER

[75] Inventors: Patrick Arondel; Jean P. Lepeytre, both of Paris, France

[73] Assignee: Thomson - CSF, Paris, France

[21] Appl. No.: 190,380

[22] Filed: Sep. 24, 1980

[30] Foreign Application Priority Data

Oct. 5, 1979 [FR] France ............... 79 24890

[51] Int. Cl.³ .................. G02B 17/06; H04B 9/00
[52] U.S. Cl. .................... 350/503; 350/294; 455/605
[58] Field of Search .......... 350/55, 27, 294, 17, 350/442, 443, 444; 455/605

[56] References Cited

U.S. PATENT DOCUMENTS

| | | | |
|---|---|---|---|
| 2,737,850 | 3/1956 | Ratiere | 350/294 |
| 3,049,054 | 8/1962 | Waland | 350/66 |
| 3,180,217 | 4/1965 | Argyle et al. | 350/444 |
| 3,433,960 | 3/1969 | Minott | 455/605 |
| 3,493,294 | 2/1970 | Fitzmaurice et al. | 455/605 |
| 3,748,015 | 7/1973 | Offner | 350/442 |
| 4,064,434 | 12/1977 | Waksberg | 455/605 |
| 4,097,125 | 6/1978 | Suzuki | 350/294 |
| 4,134,008 | 1/1979 | Corlieu et al. | 250/203 R |

FOREIGN PATENT DOCUMENTS 2380561  9/1978  France.
1401687  7/1975  United Kingdom.

OTHER PUBLICATIONS

Navy Tech. Dis. Bull., vol. 3, No. 7, Jul. 1978, pp. 9-10.

*Primary Examiner*—Jon W. Henry

[57] ABSTRACT

A retro-reflector which comprises two spherical mirrors, namely a concave main mirror and a convex secondary mirror, which are coaxial to one another and whose respective radii are in the ratio 2:1, the secondary mirror facing and being spaced from the main mirror by a distance at the most equal to its radius. Means are provided for forming a circular pupil centered on the center of curvature of the main mirror and a regulatable diaphragm positioned in front of the secondary mirror. An optoelectrical shutter can be positioned in the pupil to modulate the reflected beam and provide the optical responder function.

4 Claims, 2 Drawing Figures

CATADIOPTRIC DEVICE INTENDED FOR AN OPTICAL RESPONDER

BACKGROUND OF THE INVENTION

The present invention relates to a catadiotropic device or retro-reflector, i.e. an optical device which reflects back any incident light ray comprised in a given operating field, along its incidence direction.

Such devices are used in various fields, particularly for obtaining an optical telemeter or an optical responder.

U.S. Pat. No. 4,097,125 and British Pat. No. 1,401,687 disclose image formation devices with unity magnification and incorporating a concave spherical mirror forming the main mirror and a convex spherical mirror forming a secondary mirror which faces the main mirror and is coaxial therewith. The radius of the second mirror is smaller than that of the main mirror and can in fact be half that of the latter. The centres of curvature can be slightly displaced in accordance with the common optical axis of the device by moving the secondary mirror towards the main mirror to correct the spherical aberration.

BRIEF SUMMARY OF THE INVENTION

It is an object of the present invention to provide a catadioptric device using an optical structure of this type, which is improved from the aberration correction standpoint and whose angular field of use can be wide and regulatable so as to permit a desired discretion.

According to a feature of the invention the catadioptric device incorporates means defining an entrance/exit pupil perpendicular to the optical axis and centred on the latter at the location of the centre of curvature of the main mirror. The device also incorporates field regulation means in the form or a regulatable diaphragm located in the vicinity of the secondary mirror between the latter and the main mirror.

Another object of the present invention is to make the catadioptric device modulatable for the return transmission of information by modulation of the reflected radiation, so as to permit its application more particularly to the field of responders in identification Friend or Foe systems (I.F.F. systems).

According to another feature of the invention the retro-reflector device incorporates a modulatable electrooptical shutter (liquid crystals, ferroelectric ceramics, etc.) positioned at the pupil location to modulate the reflected radiation.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
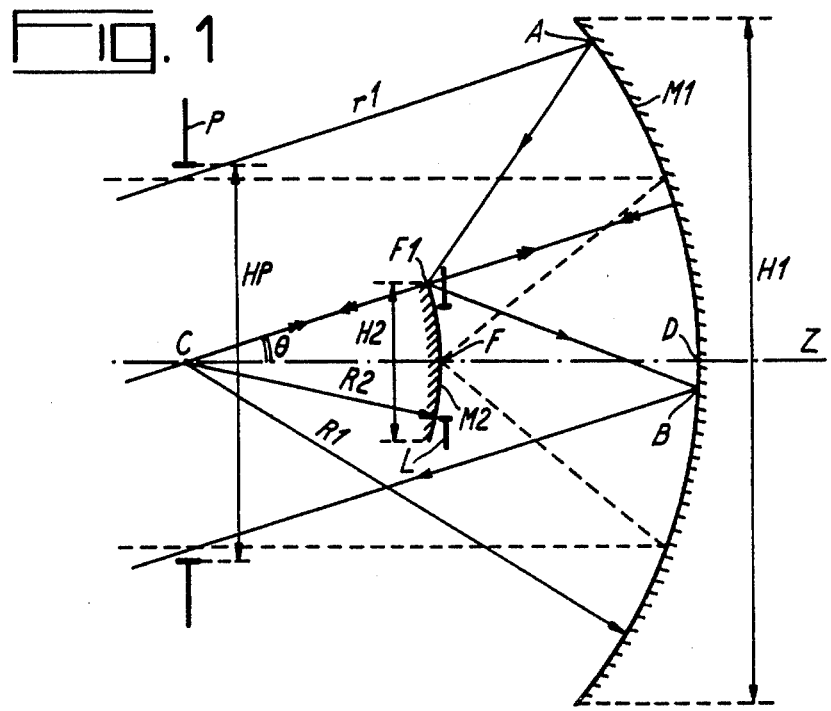
FIG. 1 a simplified diagram of a catadioptric device according to the invention.

The device of FIG. 1 comprises a group of two spherical mirrors, a first spherical mirror M1 called the main mirror and a second smaller spherical mirror M2 called the secondary mirror, means P forming a circular pupil and field regulating means L. The mirrors face one another, the main mirror being concave and the secondary mirror convex, so as to have a common axis of symmetry Z constituting the optical axis of the device. R1 and R2 are the respective radii of mirrors M1 and M2, said two values being in or substantially in the ratio 2:1, i.e. $R1 = 2R2$. A priori the secondary mirror is considered to be axially positioned in such a way that the centres of curvature coincide at C, the axial distance FD between the mirrors being in this case $R2$. H1 and H2 designate the respective widths of the mirrors, each being constituted by a sphere portion defined by a plane orthogonal to axis Z. HP represents the diameter of the circular pupil formed in a plane orthogonal to axis Z and passing through the centre of curvature C. Due to symmetry it is centred on point C.

In such an optical arrangement the entrance pupil constituted by the aperture of diameter HP also constitutes the exit pupil of the device.

An incident ray leaves in a substantially retrodirective direction after three reflections. The ray R1 for example penetrates by the entrance pupil, is reflected once on mirror M1 at A, then a second time on mirror M2 at F1 and then a third time on mirror M1 at B and leaves parallel to the initial direction on abstracting the spherical aberration and on assuming Gaussian approximation conditions. Mirror M2 represents the focal sphere of M1, i.e. the locus of the foci and F1 is the focusing focus of an incident beam of direction r1. The emerging rays are limited to those not occulted by mirror M2.

An incidence direction forms part of the angular field of the device, so that the focusing due to mirror M1 occurs at one point on the sphere portion defining mirror M2.

The field angle $\theta$ is defined by the equation $\sin\theta = H2/2R2$ or $\sin\theta = H2/R1$.

All the aberrations, with the exception of the spherical aberration, are eliminated by the fact that pupil P is located in the plane passing through the centre of curvature C of the mirrors and perpendicular to the optical axis Z of the device. The spherical aberration can be greatly reduced by slightly displacing the secondary mirror M2 by translation along axis Z so as to bring it closer to the main mirror M1. The displacement can scarcely exceed the value $0.04R2$ in order to provide the optical quality of the device suitable for operation centred on the axis. For example for a pupil diameter equal to R2 and an approximation of $0.02R2$ (the axial distance FD between the mirrors becomes $0.98R2$), the spherical aberration is negligible for an operation in a field of $\mp 20°$ (1.5 to 5 mrd instead of 17 to 33 mrd). In this C represents the centre of curvature of the main mirror, that of the secondary mirror being displaced along the axis Z by the considered quantity. Thus, the catadioptric device permits a regulation or setting as a result of the relative axial positioning of the mirrors.

The catadioptric device also permits a regulation of the field by a regulatable diaphragm L positioned in close proximity in front of mirror M2, i.e. substantially in the plane orthogonal to axis Z and passing through F. Point F represents the main focus corresponding to the focusing of rays of zero incidence (direction of axis Z). The field can be made as small as possible by regulating the diaphragm L. It can also be set very high, for example $\pm 30°$ to $\pm 45°$ without significant deterioration in the optical quality.

The catadioptric device is formed from a relatively small number of simple members and is strictly achromatic, because the optical elements are only constituted by mirrors. In the simplest form it has two mirrors M1 and M2 and the means forming the pupil M, which can be constituted by a circular opening in a casing containing the system. The mirrors are concentric or non-concentric, as a function of what has been stated hereinbefore with regard to the possible axial regulation of the secondary mirror. This arrangement can have field regulating means L, e.g. an articulated plate diaphragm, which is also called an iris diaphragm.

In another construction of the catadioptric device according to the invention it can be provided with shutter means making it possible to modulate the reflected radiation. These means comprise an optoelectric shutter positioned in pupil P, such as for example a ferroelectric material plate. Thus, the device can be used as a responder subject to the action of given radiation emitted by an emitter station and it can return a message by modulation of the reflected beam. This type of use can be envisaged in an identification Friend or Foe system.

Figure 2:
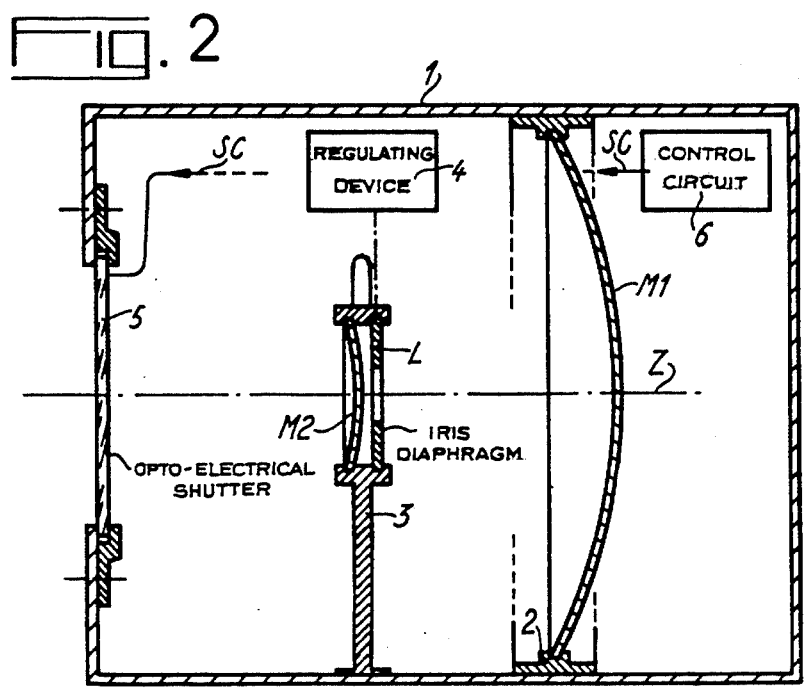
FIG. 2 a diagram of an embodiment of the catadioptric device for forming an optical responder.

FIG. 2 shows a simplified diagram of a possible constructional embodiment of the catadioptric device and on it appear the various arrangements referred to hereinbefore. The optical system M1 and M2 is located in a casing 1 having an opening forming the pupil. Element 2 symbolizes a peripheral fastening of main mirror 1 to the casing. The secondary mirror M2 is positioned by means of three arms 3 arranged at 120° fixed to the casing and such that there is a small occulting surface. Diaphragm L is also supported by elements 3. Block 4 represents the means for regulating diaphragm L and which can in part be positioned outside the casing which is e.g. the case with manual control. An optoelectrical shutter 5, e.g. a PLZT plate, is located at the pupil, whilst the corresponding electrical control SC is provided by a control circuit 6. The actions of mirrors M1 and M2 and shutter 5 are determined as a function of the envisaged operating wave band. The pupil diameter conditions the transmittable flux level and diaphragm L the observation field and discretion of the device.

The device is more particularly intended for reflecting light radiation, such as that emitted by a laser (optical telemeter, optical IFF system, etc.). However, it can also be used for microwave, electromagnetic radiation (radar, ultra-high frequency responder, beacon, etc.).

When used in an IFF system the device is completed by a receiver part where the radiation received is detected and identified so as to control the modulation via circuit 6. These elements are not described and can be realised in different ways. Reference can be made for example to U.S. Pat No. 4,134,008 which also gives information on the use of a ferroelectric ceramic for modulating the reflected radiation.

What is claimed is:
1. A catadioptric device comprising a concave spherical mirror of radius R1 and whose optical axis passes through its center of curvature, a convex spherical mirror of radius $R2 = R1/2$, whose optical axis coincides with that of the concave mirror to constitute the optical axis of the device and which faces said concave mirror at a distance from the latter which is at the most equal to the value R2 and is substantially equal to the said value for correcting the spherical aberration, means defining an optical pupil in a plane orthogonal to said axis and centered on the center of curvature of said concave mirror, said means constituiting both an entrance and an exit pupil for the device, and regulatable diaphragm means for regulating the field of the device and positioned in the vicinity of the convex mirror between the latter and the concave mirror.

2. A device according to claim 1 wherein the diaphragm is an iris diaphragm.

3. A device according to claims 1 or 2 further comprising reflected radiation modulation means utilizing an optoelectrical shutter positioned at the location of the pupil, to provide a retrodirective modulator.

4. A device according to claim 3, wherein the shutter incorporates a ferroelectric material plate and its electrical control circuit.

* * * * *